Dec. 16, 1947.    T. J. SMULSKI    2,432,690
WINDSHIELD WIPER ARM AND BLADE CONNECTOR
Filed June 25, 1943    3 Sheets-Sheet 1
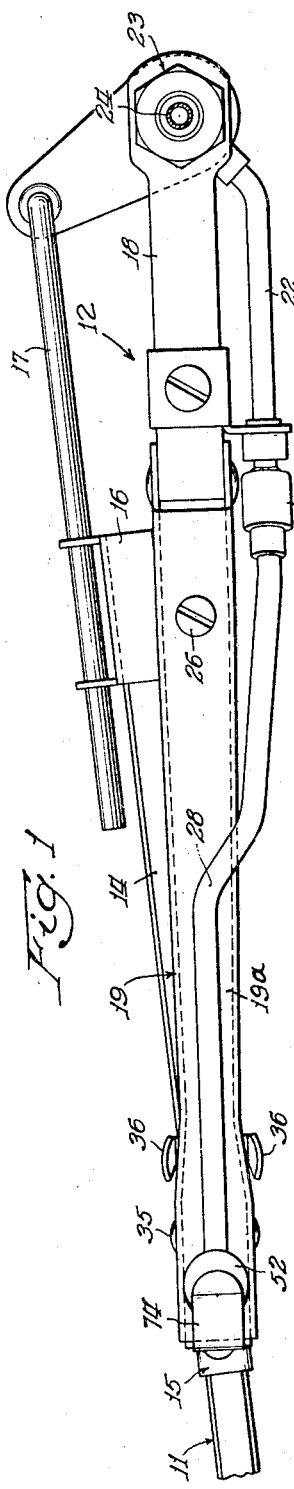
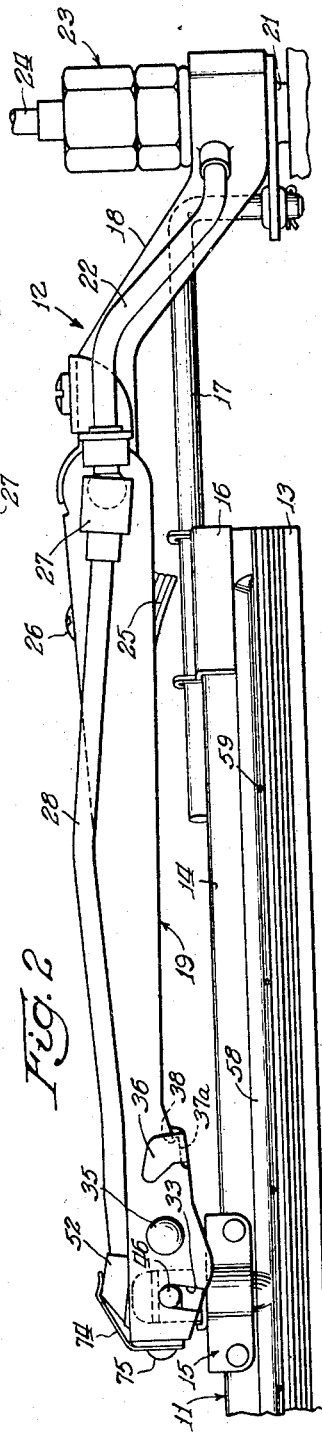
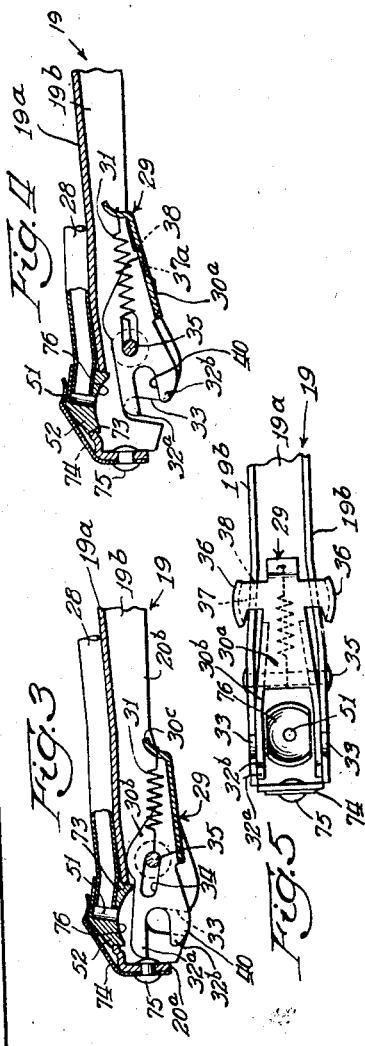
Inventor:
Theodore J. Smulski
By Clarence M. Crews.
Atty Dec. 16, 1947.  T. J. SMULSKI  2,432,690
WINDSHIELD WIPER ARM AND BLADE CONNECTOR
Filed June 25, 1943  3 Sheets-Sheet 2
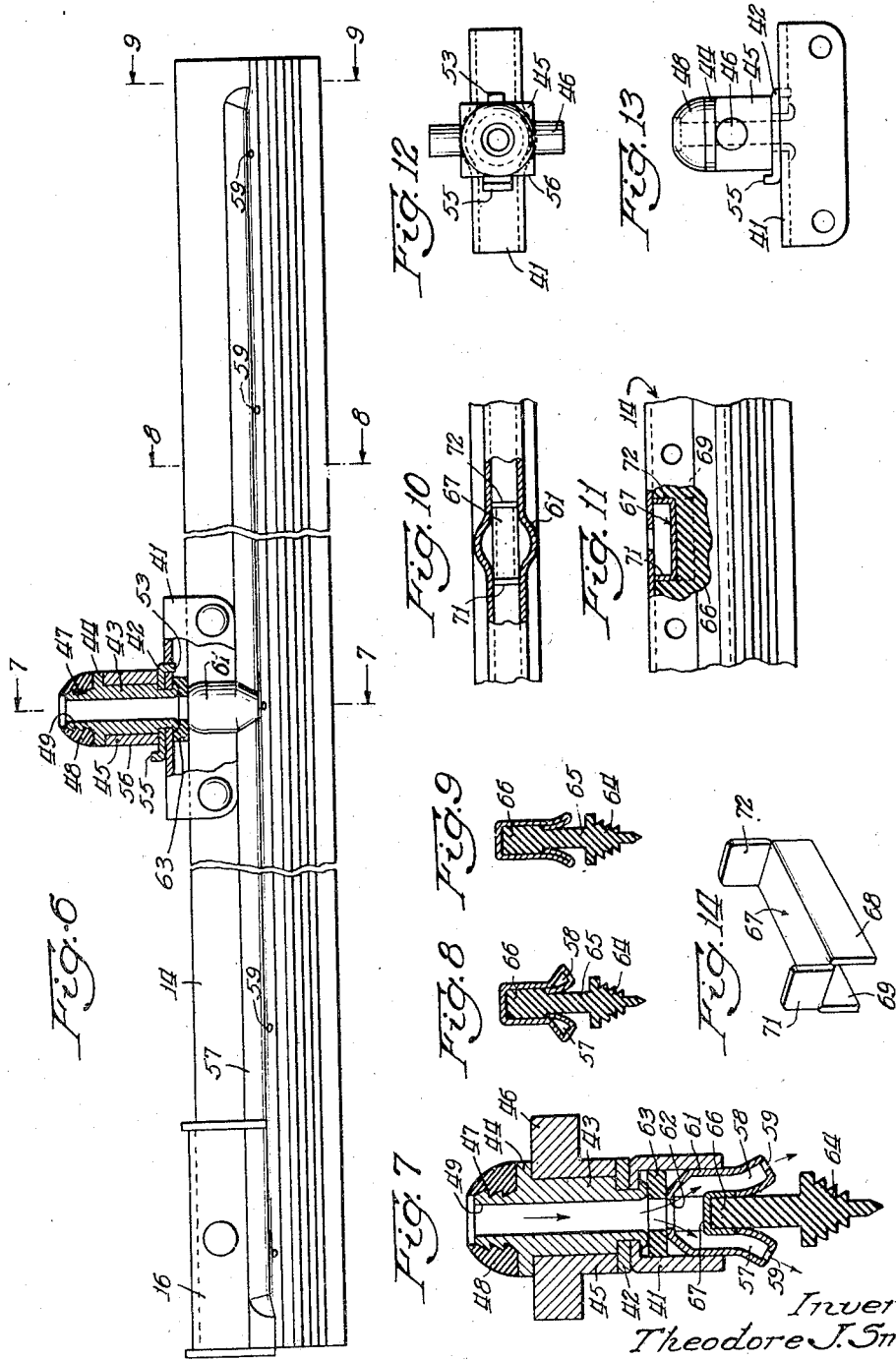
Inventor:
Theodore J. Smulski
By: Clarence M. Crews
Atty

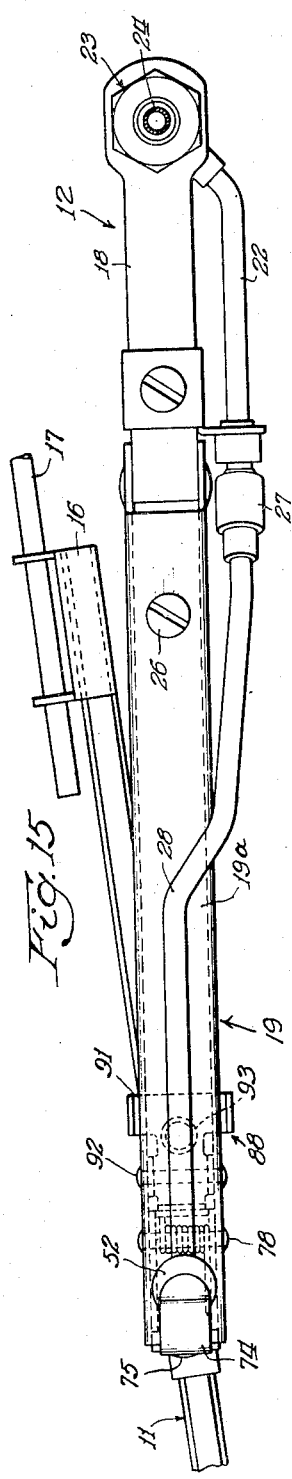

Patented Dec. 16, 1947

2,432,690

UNITED STATES PATENT OFFICE 2,432,690

WINDSHIELD WIPER ARM AND BLADE CONNECTOR

Theodore J. Smulski, Gary, Ind., assignor to Productive Inventions, Inc., a corporation of Indiana Application June 25, 1943, Serial No. 492,252

26 Claims. (Cl. 15—250.4)

My invention relates to windshield wipers, and more particularly to windshield wiper cleaners of the type which supply a cleaning fluid to the windshield.

Heretofore numerous windshield wiper cleaners have been devised with means for applying a cleaning fluid to clean, defrost or de-ice a windshield. In the past, such cleaners have been designed for use on land and marine craft, but more recently cleaners of this type have been designed for use on aircraft. The structure of such cleaners for aircraft differs from the former land and marine craft wiper cleaners because of various factors which did not enter into previous designs but which now are of importance. A windshield wiper cleaner suitable for aircraft has been shown, described and claimed in my patent application for an improvement in Windshield wipers, Serial No. 401,951, filed July 11, 1941, which has since matured into Patent No. 2,348,502 dated May 9, 1944. This wiper includes a wiper arm provided with a fluid conduit and a wiper blade provided with fluid conduits to spread cleaning fluid properly across the surface to be wiped by the windshield wiper blade.

In aircraft windshield wiper cleaners the wiper arm pressure is many times greater than that encountered in other vehicle wiper cleaners. This factor, together with increased abuse from the elements which results from the high velocity of aircraft causes rapid wear and deterioration of the wiper blade and makes frequent replacement necessary. In making provision for the replacement of wiper blades resort is usually had to some form of detachable connection between the blade and arm. In an aircraft wiper cleaner this connection must be positive in operation, should be relatively simple to operate, and must provide substantially uniform pressure of the blade against the windshield through the length of the blade while maintaining a fluid-tight connection between the conduits of the blade and the arm.

In providing windshield wiper cleaners for aircraft there exists a very important problem of preventing the wiper blade from becoming detached from the arm. The loss of the wiper blade in flight may bring about serious consequences both from the reduced vision, and from the danger of the blade striking the propeller and thus causing sufficient damage to completely disable an engine or the entire craft. Therefore the detachable connection between the blade and the arm must be positive in its holding action so that under normal operating conditions there is no likelihood of the wiper blade becoming separated from the arm.

The task of replacing a windshield wiper blade on aircraft frequently is difficult and awkward because of the relative inaccessibility of the blade and arm assembly and hence it is highly desirable to provide a locking assembly which can be operated without the use of any tools. By providing a relatively simple self-locking connection between the blade and arm, there may also be eliminated an element of human error brought about by a lack of knowledge or skill, or lack of care on the part of the operator to make certain that the blade which he has put in place is actually locked to the arm. Therefore, it is desirable to provide a detachable connection of a locking type whereby the assembly must be unlocked by a simple manual operation in order to remove a blade for replacement and preferably such an arrangement is provided with a simple locking arrangement whereby a replacement blade is securely re-locked to the arm.

In providing for the replacement of wiper blades in air-craft windshield wiper cleaners it is important that a fluid-tight connection between the conduits of the wiper arm and of the wiper blade be maintained, so that there will be no loss of the cleaning fluid, the practice being to limit the supply of cleaning fluid to that quantity which is thought to be the minimum quantity requisite to assure safety. In order to provide proper operation of the wiper blade element over its entire length it is desirable to provide an arrangement whereby substantially uniform pressure is obtained throughout the length of the wiper blade irrespective of the angular disposition of the windshield wiper arm with respect to the windshield. This can be accomplished by providing an arrangement whereby the wiper blade is hingedly mounted on the arm.

In accordance with my invention I provide a windshield wiper cleaner for use with earth-bound vehicles but more especially for aircraft, having an assembly which permits the replacement of windshield wiper blades. This assembly provides a fluid-tight connection between the conduits of a wiper blade and arm and yet the wiper blade is hingedly mounted on the arm so as to obtain the proper distribution of pressure throughout the length of the blade. The locking assembly furthermore is positive in operation and relatively simple to operate so that replacement of the blade is facilitated and yet provision is made to prevent improper connection between a blade and arm and also to prevent accidental removal of the blade from the arm. Other types or forms of locking means or connectors are disclosed and claimed in my copending applications Serial No. 523,445 filed February 22, 1944 for Windshield wiper blade connectors; Serial No. 530,628 filed April 12, 1944 for Automatic blade clips; Serial No. 662,862 filed April 17, 1946 for Means for connecting a windshield wiper unit to an arm unit; and in an application of John W. Anderson, Serial No. 673,098 filed May 29, 1946 for Connection means between operating and operated units, owned by my assignee.

It is an important feature of my invention that the wiper arm is provided with what may be called a trigger type locking connection which is cocked to a blade-receiving condition as an incident of the removal of an old blade, self-retained in the cocked or blade-receiving condition, and tripped to effect a positively locked condition by the mere pressing into place of a new blade.

It is therefore an object of my invention to provide an improved windshield wiper cleaning assembly which will overcome certain disadvantages inherent in many of the devices of the prior art and which takes into consideration the various essential factors necessary for providing a properly operating windshield wiper arm and blade assembly for aircraft.

Another object of my invention is to provide an improved windshield wiper cleaner of the type wherein cleaning fluid is conducted adjacent the flexible wiper element of the wiper blade.

Another object of my invention is to provide an improved windshield wiper blade and arm assembly for windshield wipers of the cleaning and defrosting type wherein the wiper blade may be readily replaced without the use of tools.

Still another object of my invention is to provide an improved windshield wiper cleaning assembly for cleaning, defrosting and de-icing windshields whereby the wiper blade will contact the windshield over substantially its entire length with substantially uniform pressure irrespective of the angular disposition between the wiper arm and the wiped surface.

Other and further objects of my invention will become apparent by the following description taken in connection with the accompanying drawings in which:

Fig. 1 is a top view of a practical and advantageous windshield wiper cleaner arm and blade assembly embodying features of my invention;

Fig. 2 is a side view of the apparatus shown in Fig. 1;

Figs. 3 and 4 are cross-sectional views through the attachment apparatus mounted adjacent the free or outer end of the wiper arm;

Fig. 5 is a bottom view of the attachment apparatus;

Fig. 6 is a broken side view of a wiper blade showing a partial cross-sectional view through the attachment means mounted on the wiper blade;

Fig. 7 is a cross-sectional view through the wiper blade and the attachment means as seen along a line in Fig. 6 in the direction of the arrows 7—7;

Figs. 8 and 9 are further cross-sectional views of the wiper blade of Fig. 6 as seen along lines in the directions of the arrows 8—8 and 9—9 respectively;

Fig. 10 is a sectional view through a central portion of the wiper blade of Fig. 6 as seen along a line in the direction of the arrows 10—10;

Fig. 11 is a view partially in cross-section of a central portion of the blade of Fig. 6 as seen along a line of Fig. 10 in the direction of the arrows 11—11;

Fig. 12 is a top view of the attachment means of the wiper blade;

Fig. 13 is a side view of the attachment means of the wiper blade;

Fig. 14 is a perspective view of a clip shown in position within the wiper blade frame in Figs. 7, 10 and 11;

Fig. 15 is a top view of a wiper blade and arm assembly which is a modification of my invention;

Fig. 16 is a side view of the assembly shown in Fig. 7;

Fig. 17 shows the attachment means on the wiper blade adjacent a cross-section of the locking apparatus mounted adjacent the free end of the wiper arm; and Fig. 18 is a longitudinal cross-section through the attachment means on the wiper blade together with a side view of the locking apparatus mounted adjacent the free end of the wiper arm.

Referring more particularly to Figs. 1 and 2 there is shown a wiper blade 11 pivotally and hingedly mounted adjacent the free end of a wiper arm 12. The wiper blade comprises a flexible wiper element 13 supported by a rigid wiper blade frame 14 which is provided at an intermediate point with attachment means 15, and adjacent one end with guiding means 16. The attachment means 15 is locked to the wiper arm 12 by a locking apparatus carried adjacent the free end thereof with freedom to rock about a transverse axis. The guiding means 16 is engaged by a guide rod 17 pivotally mounted a short distance to one side of the wiper arm actuating shaft so that the movement of the wiper blade over the windshield surface will be modified as compared to the action of a wiper blade which oscillates in unison with a wiper arm. The wiper arm 12 comprises an inner arm section 18 which pivotally supports an outer arm section 19. The inner arm section 18 is secured forwardly of a windshield to an actuating shaft 21 of a suitable windshield wiper mechanism. The inner arm section 18 is provided with a fluid conduit 22 which is interconnected by a universal joint assembly 23 to a fluid conduit 24 which is connected to a suitable source of cleaning fluid. The fluid conduit 22 being attached to the movable wiper arm section 18 has an angular movement relative to the fixed fluid conduit 24 and the universal joint assembly 23 permits this relative movement. This universal joint apparatus 23 does not constitute a part of the present invention, but is shown, described and claimed in my copending application, Serial No. 521,904, filed February 11, 1944, for Fluid transmission connections for cleaner wipers, which has been executed concurrently herewith. The outer arm section 19 which is pivotally supported on the inner arm section 18 is provided with a spring assembly 25, the tension of which may be adjusted by suitable tensioning means actuated by a screw 26 so as to bias the free end of the arm section 19 toward the surface of the windshield. The fluid conduit 22 of the inner arm section 18 is connected by a pivot or universal joint 27 to a fluid conduit 28 mounted on the outer arm section and terminating adjacent the free end thereof.

Reference may now be had to Figs. 3 to 7 as well as Figs. 1 and 2 to show how the wiper blade 11 by means the attachment member 15 is hingedly connected to the free end of the wiper arm section 19. The wiper blade attachment means 15 (see Fig. 7), will be described in detail hereinafter, but for the present it is important to note that this attachment assembly includes an outer supporting sleeve 45 which has outwardly extending, diametrically aligned bearing pins or trunnions 46. The assembly is engaged by a locking apparatus mounted adjacent the free end of the arm section 19.

The wiper arm section 19 is a channeled member having a front wall 19a and side walls 19b, the front and side walls jointly defining a rearwardly facing channel. Near the outer end of the arm section 19 the side walls 19b are provided with correspondingly located rearwardly extending slots 33 which are adapted to receive and partially embrace the respective bearing pins 46 of the sleeve 45.

A locking member 29 is mounted on the arm section 19 within the channel thereof and is adapted to cooperate with the arm section 19 for pivotally supporting the bearing pins 46 and detaining them against unwanted movement. The locking member 29 comprises a body member 30a and side wall members 30b which extend forwardly within but adjacent to the respective side wall members 20b of the arm section 19. A rivet 35 has its enlarged ends disposed at the outer sides of the walls 19b and the shank or body thereof passed through the side walls 19b and across the channel or arm section 19 to serve as a means for attaching the locking member 29 to the arm section 19 for supporting the locking member 29 with capacity for controlled rocking and bodily movement relative to the arm section 19. The rivet 35 also serves as a tie rod to reinforce the channel member 19. The body of rivet 35 passes through correspondingly formed and located slots 34 in the walls 30b of the locking member 29.

A tension coil spring 31 connected to the rivet 35 and to a tail portion 30c of the locking member 29 tends to draw the locking member 29 outward along the arm section 19 to engage the inner ends of the slots 34 with the body of rivet 35 in a position like that illustrated in Fig. 3. The locking member 29 is, however, adapted to be operated by finger pieces 36 to a retracted position as illustrated in Fig. 4, and to be detained in that position.

The finger pieces 36 extend forward at the outer sides of side wall members 19b and are connected to the body member 30a of the locking member 29 through necks 37, the necks 37 extending across the rear faces of the side walls 19b of arm section 19. The forward faces of the necks 37 engage rear surfaces 37a of the side walls 19b when the parts are in the position illustrated in Fig. 3, positively to prevent rocking of the locking member 29 about the body of rivet 35 in a counter-clockwise direction (as viewed in Figs. 3 and 4). When the locking member 29 is retracted, however, the locking member may be rocked about the rivet 35 as a fulcrum to swing the outer end of the locking member 29 rearwardly and the inner end of the locking member forwardly, the necks 37 being thereby lodged and detained in detaining notches 38 which are formed in the rear margins of the side walls 19b adjacent the surfaces 37a. Shoulders at the outer ends of the notches 38 and the forward faces of the necks 37 are sufficiently abrupt to avoid any tendency toward camming of the necks 37 out of the notches 38 under the influence of spring 31. It is natural for the operative to lift the arm away from the glass while detaching the blade. Hence no special effort or attention is required to press the necks 37 into the notches 38.

The side walls 30b extend outward beyond the outer end of body member 30a, and each is formed with an outwardly extending slot 40 which divides the wall into a forward jaw 32a and a rear jaw 32b. The forward jaws 32a are longer than the rear jaws 32b. The jaws 32a are long enough to extend across and beyond the slots 33 in the position of Fig. 3, and to extend at least part way across the slots 33 in the retracted position of Fig. 4. The jaws 32b are long enough to extend completely across the slots 33 in the position of Fig. 3, but stand substantially clear of the slots 33 in the retracted position of Fig. 4.

The retracted position of Fig. 4 is the receiving position of the locking member 29. When a wiper blade is to be put into place, the bearing pins 46 of the wiper blade assembly are inserted in and moved forwardly along the slots 33 until they engage the jaws 33a of the locking member 29. Further forward movement of the pins 46 rocks the member 29 about 35 as a fulcrum, dislodging the necks 37 from the notches 38. The spring 31 thereupon snaps the locking member 29 outward to the position illustrated in Fig. 3. This movement of the locking member 29 locks the bearing pins 46 positively against dislodgment, the jaws 32b being projected outward across the slots 33 behind the pins 46, and the necks 37 being projected outward to a position where they can no longer enter the notches 38 and where, through cooperation with the surfaces 37a of the walls 19b, they positively prevent rocking of the locking member in a counter-clockwise direction away from the position illustrated in Fig. 3.

When it is desired to remove an old blade, the operator seizes the locking member 29 by the finger pieces 36 and draws the locking member inward along the wiper arm, exerting at the same time a slight forward pull to cause the necks 37 to become locked in the recesses 38. This operation frees the old wiper blade, causing it to fall to the ground or at least enabling it to be readily removed after the locking member 29 has been latched in retracted position. A new wiper blade is then inserted in the manner already described.

It will be observed that the slots 40 and 33 are disposed substantially at right-angles to one another in the locking position of Fig. 3, and hence the jaws which define the slots form substantially complete bearings for the pins 46 and serve completely to prevent unwanted bodily movement of the sleeve 45 and the attachment means 15 of the wiper blade assembly. The boundaries of the slots 33 oppose bodily movement of the assembly 15 longitudinally of the wiper arm, and the boundaries of the slots 40 oppose bodily movement of the assembly 15 in a fore and aft direction. Since laterally spaced bearings are provided by the slots 40 and 33 at opposite sides of the stem assembly, any tendency toward turning of the sleeve 45 about its own fore and aft axis or about an axis extending lengthwise of the wiper arm is strongly opposed and is overcome. This is particularly important in connection with the ready establishment and maintenance of a liquid-tight joint between the fluid conduit of the wiper arm and the stem of the assembly 15 which will be described a little further on. The surfaces 37a of the walls 19b extend in such angular relation to the slots 34 that they exert a slight camming action upon necks 37 of the locking member 29, tending to rock the locking member in a clockwise direction in response to the outward pull exerted upon the locking member by the spring 31. The locking member tends, therefore, to resiliently urge the pins 46 in a forward direction, a feature which is important in connection with the establishment and maintenance of a liquid-tight joint between the wiper blade and the wiper arm, as will be hereinafter made clear.

It will be readily apparent that the locking member has only two possible positions; to wit, the locked position which is substantially that of Fig. 3, and the fully retracted position of Fig. 4. Bearing pins 46 of a wiper blade assembly cannot be inserted in the slot 33, unless the locking member 29 is in its fully retracted position. The locking member is tripped only when the pins 46 have been inserted to substantially the full depth of the slot 33, and at that time they will be in engagement with the jaw 32a of the locking member and in a position to be received by the slots without in any way obstructing the locking member 29. There is no liability, therefore, of a wiper blade being imperfectly secured in place through the operation of the locking member to an intermediate position.

The wiper blade channel 14 has a construction which provides a pair of fluid conducting passages 57—58 as may be seen from Figs. 2, 6, 7 and 8. This particular construction of the wiper blade is shown, described and claimed in my Patent No. 2,348,502, dated May 9, 1944. Such a wiper blade provides an arrangement whereby the cleaning fluid is conducted to the windshield immediately adjacent the wiper element and at a proper distance and angle with respect to the windshield wiper blade. The frame 14 of the blade 11, as has been mentioned, is carried by a clip 41 which forms part of the attachment means 15.

Immediately above the clip 41 there is positioned a bearing plate and limit stop 42 which is retained in position by a member 43 which has a reduced portion extending through aligned apertures in the bearing plate 42 and the clip 41 so that the member 43 will be secured in place by riveting or rolling over the reduced end of this member, as may be seen from Figs. 6 and 7. That portion of the member 43 immediately above the stop plates 42 is cylindrical and adjacent to this cylindrical portion is a collar portion 44. The cylindrical portion between the collar 44 and the bearing plate 42 is surrounded by an attachment sleeve member 45 which is provided with trunnions or bearing pins 46. From a top view of the attachment means 15, shown in Fig. 12, it will be seen that the member 45 is rectangular or square in shape so that the two sides which bear the trunnions 46 will fit between the side walls 30b of the locking member 29 of Figs. 3 to 5. Immediately above the collar portion 44 of the member 43 there is a reduced portion 47 having a plurality of circumferential tooth-like collars for retaining in position a suitable resilient gasket member 48. The resilient member 48 in non-compressed condition as shown in Figs. 6 and 7 preferably extends slightly above the reduced end portion 47 of the member 43 so as to assure a good seal between the passage 49 of the member 43 with a fluid passage 51 in a terminal block portion 52 of the wiper arm shown in Figs. 3, 4 and 16.

By referring to Figs. 6 and 12 it will be seen that the limit stop and bearing plate 42 has at one end a downwardly turned projection 53 which extends into an aperture 54 in the top of the clip 41. At the other end of the bearing plate 42 there is an upturned finger 55 which serves as a limit stop for the externally rectangular sleeve 45 which, it will be remembered, is rotatively mounted upon the inner member 43. The extent of movement permitted is determined by the angle through which the member 45 may be rotated between the two positions in which the forward face 56 of the sleeve 45 engages the finger 55. The range of available movement is wide enough to avoid interference with the action of the blade as controlled by the rod 17. Limitation of movement is provided to facilitate application of the blade to the wiper arm.

The wiper blade 11 has a blade channel 14 which is provided with two longitudinal fluid passages 57 and 58, as seen in Fig. 8, through which fluid is conducted to spaced apertures therein such as 59 shown in Figs. 6 and 7. At the center of the blade frame 14 the fluid passages 57 and 58 are joined together by the pressed out portion 61 as shown in Fig. 6, and seen in cross-section in Fig. 7. Pressed out portion 61 extends to the top of the blade frame 14 where the frame is provided with an aperture 62 shown in Figs. 6, 7 and 11. A suitable gasket 63, preferably of resilient material, is positioned between the top of the blade frame 14 and the end of the fluid passage 49 of the member 43 which is secured to the clip 41.

The flexible wiping element 13 which is held by the blade frame 14 has a wiping head portion 64 connected by a thin web portion 65 to an enlarged body portion 66. The enlarged body portion as seen in Figs. 8 and 9 fills the wiper blade channel. At the center of the wiper blade a portion of the body 66 is reduced in width and is cut away as seen in Figs. 7, 10 and 11, to provide a connecting passage between the two longitudinal fluid passages 57 and 58 and the enlarged portions 61 in the center of the blade channel. In order that the body 66 of the wiping element 13 adjacent this cut out portion may not be deformed to close or objectionably obstruct the passage 62 or the passages formed by the portion 61 of the blade frame, the wiping element is supported by a rectangular clip 67 shown in perspective in Fig. 14. The clip has a body portion 67 with two depending sides 68 and 69 and thus forms a channel-like structure which embraces a portion of the wiper element 13 as may be seen from Figs. 7 and 10. The clip 67 is provided at the ends thereof with upturned portions 71 and 72 which serve to space the body 67 of the clip from the top of the blade frame 14 as may be appreciated from Figs. 10 and 11. Referring to Figs. 3 and 4 it will be seen that the fluid conduit 28 is provided with a terminal block portion 52 which is slidingly fitted in an opening 73 formed in the arm section 19 adjacent the end of portion 19a and which is pressed into and retained in position by a suitable spring clip 74. The spring clip 74 is secured by suitable fastening means such as a rivet 75 to an outer end portion 20a of the arm section 19. The terminal block 52 is provided with the fluid conduit 51 which extends through to a concave rear surface 76 which is desirably parti-spherical. The center of the concave surface 76 lies substantially at the intersection of the transversely extending axis of trunnions 46 with the fore and aft axis of the sleeve member 45. The surface 76 is engaged by the convex upper surface of the resilient gasket member 48 which surrounds the upper portion 47 of the member 43 of the attachment means 15. The opposing pressures exerted by the clip 74 and the spring urged locking member 29 assure at all times the maintenance of a liquid-tight joint between the terminal block 52 and the passage 49 of the tubular member 43, and this without resort to objectionally fine manufacturing tolerances. By initially making the parts so that the gasket 48 will engage the surface 76 before the trunnions 46 reach engagement with the inner ends of slots 33, assurance may be provided that the joint between 48 and 76 will be maintained liquid-tight even when the member 48 has become worn away to a considerable extent.

The pins or trunnions 46 which are mounted within the slots or recesses 33 of the arm channel 19 provide a hinged connection between the arm section 19 and the wiper blade 11 so that irrespective of the angular disposition of the outer arm section relative to the surface of the windshield substantially the entire length of the wiper blade may contact with uniform pressure the surface of the windshield.

Reference may now be had to Figs. 15 to 18 wherein there is disclosed another embodiment of my invention, the wiper blade and the wiper arm assembly being identical with that of Figs. 1 to 14, save as to the locking means. Wherever the parts of the arm and blade assembly are the same as the parts shown in the previous figures, these parts have been given corresponding reference characters, and as to them the detailed description will not be repeated.

The locking apparatus positioned adjacent the free end of the outer wiper arm section 19 of Figs. 15 to 18 differs in the construction and arrangement of its parts from the corresponding apparatus of Figs. 1 to 5. The outer channel-like portion of the wiper arm 19 is provided with recesses 77 in the side walls 19b thereof for receiving the laterally projecting bearing pins 46 of the sleeve member 45.

Pivotally supported upon a fixed shaft 78 is a locking member 79 which comprises a body member 81 and side wall members 82, and which is biased in a counterclockwise direction toward the unlocking position illustrated in Fig. 17 by a suitable spring 83. The outer extremity of each side wall 82 of the locking member 79 is provided with an outwardly extending slot 84 which divides the side wall into an upper jaw 85 and a lower jaw 86. Adjacent the inner end of the locking member 79 there is an upturned tail portion 87 against which a retaining member 88 is arranged to operate. The retaining member 88 is provided at its outer end with a projecting nose portion 89 adapted to engage the inner portion of the locking member 79. The inner end of the retaining member 88 is provided with a finger piece 91. The retaining member 88 is pivotally mounted on a suitable fixed shaft 92, and is biased by a compression spring 93 in a clockwise direction.

In the locking position of Fig. 16 the locking member 79 is positively retained in locking position by a projecting nose portion 89 of the retaining member 88. In this locking position the locking member 79 is swung to its clockwise limit of movement, determined by engagement of gasket 48 with block 52, so that the lower jaw 84 effectively closes the recess 77, thereby imprisoning the trunnions 46 of the bearing member 45. The nose 89 of the retaining member 88 prevents any counter-clockwise movement of the locking member 79 because this nose is in engagement with a surface of the upturned tail portion 87 of the locking member 82, which, with the parts in the positions illustrated in Fig. 16, extends nearly perpendicular to a radius drawn from the axis of shaft 92 to the point of contact of nose 89 with tail 87. Any force applied to the locking member 79 in a direction to urge the locking member counter-clockwise is transmitted to the retaining member 88 along a line which passes nearly through, but a little to the rear of the axis of shaft 92. The locking member 79 cannot, therefore, cam the retaining member 88 in a counter-clockwise direction.

The tail 87 of the locking member 79, through its engagement with the nose 89 of the trigger or retaining member 88, as seen in Fig. 16, obstructs clockwise movement of the retaining member 88.

The direction of the bearing surface of the tail 87 is such, however, that the clockwise torque applied to retaining member 88 by spring 93 is transmitted to the member 79 as a force tending to bias the locking member in a clockwise direction. As the gasket 48 wears away, therefore, the stem assembly, including the gasket, is shifted forward to compensate for the wear, and the liquid-tight character of the joint between the gasket 48 and the block 52 is maintained.

The retaining member 88 can be readily rocked manually in a counter-clockwise direction away from the position of Fig. 16 to swing the nose 89 downward and out of obstructing relation to the tail 87, whereupon the locking member 79 will be snapped counter-clockwise to the position illustrated in Fig. 17, in which the forward surfaces of the inner ends of the walls 82 engage forward wall 19a of the arm section 19. This movement of the locking member 79 carries the inner end of the body member 81 across the tip of the nose 89, and when the retaining member is then released the nose will be prevented from returning to the Fig. 16 position by engagement with body portion 81.

When now the bearing pins 46 of a wiper blade 11 are inserted in the slots 84 and pressed forward into the recesses 77, the nose 89 is cammed aside by the body portion 81 of the locking member 79. As the bearing pins are pressed home, the nose 89 slips clear of the body portion 81 of the locking member 79 and snaps into the locking position of Fig. 16 in engagement with the inner face of the tail 87.

The arrangement is such that the nose 89 cannot clear the body part 81 until the bearing pins 46 have been inserted into the notches 77, and the bearing pins cannot be so inserted into the notches 77 unless they have been first inserted to the full depth of the slots 84. If, however, the wiper blade is thrust forward with the bearing pins only partially inserted in the slots 84, the bearing pins will be caused to engage inclined rear faces 94 at the outer ends of walls 19b, and will be cammed inward by the faces 94 to the inner ends of the slots 84 and into alignment with the notches 77.

If the operator through negligence fails to insert the bearing pins 46 far enough into the notches 77 to trip the retaining member 88 and effect the locking action which has been described, the parts will upon release of the wiper blade by the operator return to the condition of Fig. 17, and will thereby immediately eject the wiper blade, leaving no possible doubt as to whether or not the wiper blade has been correctly locked in place.

As in the case of the structure of Figs. 1 to 5, the notches 77 and the slots 84 cooperate to form laterally spaced substantially complete bearings for the pins 46, the consequence being that the sleeve 45 can neither shift bodily, twist or tilt relative to the wiper arm. The only relative movement between the sleeve 45 and the wiper arm which is permitted is the pivotal movement about the axis of the bearing pins 46 which is intentionally provided in order that the pressure of the wiper blade against the windshield may be distributed evenly throughout the length of the wiper blade.

From the above description it will be apparent that the locking means of Figs. 15 to 18, like the locking means of Figs. 1 to 5, has only two positions, a locking position and an unlocking position, so that there is no possibility of a partial or improper connection being had between the wiper blade and the wiper arm.

While cleaner wipers for aircraft have been illustratively shown and described, it will be appreciated, of course, that the invention may also be embodied in cleaner wipers for earthbound vehicles, and that the locking features may be utilized without the cleaning fluid features.

I have described what I believe to be the best embodiments of my invention. I do not wish, however, to be confined to the embodiments shown, but what I desire to cover by Letters Patent is set forth in the appended claims.

I claim:

1. A wiper mounting for interconnecting a wiper arm unit and a wiper blade unit in hinged relationship, one of the aforesaid units including an attachment member having trunnions, and the other of said units including a cooperating locking apparatus which comprises a member having spaced bifurcated portions adapted to receive the respective trunnions and movable transversely of the trunnions between trunnion locking and unlocking positions, means cooperative with the open ends of said bifurcated portions of said movable member when the latter is in locking position, and spring actuated means for retaining said movable member in locking position.

2. A wiper mounting for interconnecting a wiper arm unit with a wiper blade unit, a male transverse attachment member on one of the aforesaid units, female locking apparatus on the other of the aforesaid units, said apparatus including slotted portions adapted to receive said male transverse attachment member in one operative position thereof, means cooperating with the open ends of the slots in another operative position of the slotted members, and spring actuated means for positively preventing movement of said slotted members from the position last referred to in response to force applied through the wiper blade unit.

3. A snap locking wiper mounting for hingedly interconnecting a wiper arm unit with a wiper blade unit, one of the aforesaid units including a member having a pair of bearing trunnions, and the other of said units comprising a locking apparatus having bearing portions for receiving the respective trunnions, a movably mounted locking member having slotted portions adapted to receive the respective trunnions, said member being adapted, as an incident of the insertion of the trunnions into said bearing portions, to be engaged and moved toward a position in which the slotted portions and the bearing portions cooperate substantially to surround and to imprison the trunnions, and spring actuated means tripped by such movement to lock the movably mounted member positively against retraction and thereby to lock said trunnions positively against separation from the locking apparatus but with capacity for rocking movement, said capacity for rocking movement serving to enable the wiper blade to exert throughout its length substantially uniform pressure against the windshield independently of the angular relation of the wiper arm to the surface of said windshield.

4. In a windshield cleaning apparatus, the combination comprising a wiper arm element, a wiper blade element, and means for hingedly interconnecting said elements, one of said elements being provided with a male pivot attachment member adapted to be engaged by an apparatus carried by the other of said elements, said apparatus comprising a channel-like portion provided with recesses in the sides of said channel, a pair of bifurcated members pivotally mounted within said channel for movement between locking and unlocking positions, a spring for biasing said bifurcated members toward unlocking position, and a retaining member spring-urged toward said bifurcated members, said bifurcated members being arranged to be engaged by said attachment member and to be moved thereby as an incident of the positioning of said attachment member within the recesses of said channel portion, said retaining member thereupon operating in response to such movement of the bifurcated members to prevent accidental disengagement of said wiper elements.

5. In a windshield cleaning apparatus the combination comprising a wiper arm element provided with a fluid conduit which terminates adjacent the free end of the arm, a wiper blade element having a fluid conduit terminating at an intermediate point thereon, a male pivot attachment member carried by one of said elements adjacent the fluid terminal thereof, an apparatus carried by the other of said wiper elements adjacent the fluid terminal thereof for hingedly engaging said male pivot member, said apparatus comprising a channel-like portion having recesses for receiving said male pivot member, and a pair of movable bifurcated members positioned adjacent said recesses and constructed and arranged to have a portion thereof positioned to block the entrance to said recesses in locking position, means for retracting said bifurcated members to unlocking position, and spring means for retaining said bifurcated members in locking position thereby to lock said attachment member in said recesses and to join the terminals of said fluid conduits together.

6. In a windshield cleaning apparatus, the combination comprising a wiper blade element having a plurality of fluid conduits, a wiper arm element having a fluid conduit terminating adjacent the free end thereof, and means for hingedly interconnecting said elements and for connecting said fluid conduits, one of said elements being provided with a male pivot member constructed and arranged to provide the terminals of said plurality of fluid conduits of said element, the other of said elements being provided with an apparatus adjacent the terminal of the fluid conduit thereof, said apparatus including a channel-like portion having mounted therein a pivoted member adapted to be engaged by and actuated by the male pivot member of said one element, said pivoted member being arranged to align the terminals of said conduits with each other, and spring-biased locking means for positively retaining in locked position said pivoted member, thereby to prevent accidental disassembly of said wiper elements.

7. In a windshield cleaning apparatus, the combination comprising a wiper arm provided with a fluid conduit extending to the free end thereof, a terminal block for said fluid conduit positioned adjacent the free end of said arm, a wiper blade having a fluid conduit for supplying fluid to a windshield, attachment means mounted on said blade for connecting said blade to said arm, said attachment means including a fluid conduit terminal, locking means mounted adjacent the free end of said arm for engaging said attachment means thereby to secure said blade releasably to said arm, the blade being normally held against separation from the arm by the locking means, and resilient means mounted on said arm and bearing against the wiper arm terminal block to bias said wiper arm terminal block against said wiper blade fluid conduit terminal when the latter is held in place by the locking means.

8. In a windshield cleaning apparatus, the combination comprising a wiper blade having a fluid conduit for supplying fluid to a windshield, attachment means mounted on said blade for connecting said blade to a wiper arm, said attachment means including a fluid conduit terminal having a surface of a predetermined configuration about a fluid passage, a wiper arm having adjacent the free end thereof an apparatus for hingedly engaging said attachment means to secure said blade to said arm, a fluid conduit for said arm having a terminal portion adjacent the free end of the arm, said terminal portion having a surface of a predetermined configuration, the center of which lies substantially in the axis of said hinged connection, and means mounted on said arm for pressing the terminal surfaces against one another.

9. In a windshield cleaning apparatus, the combination comprising a wiper arm provided with a fluid conduit, a terminal block for said fluid conduit positioned adjacent the free end of said arm, a wiper blade having a fluid conduit for supplying fluid to a windshield, attachment means mounted on said blade for connecting said blade to said arm, said attachment means including a fluid conduit terminal, and snap locking means mounted adjacent the free end of said arm for hingedly engaging said attachment means, positively to secure said blade to said arm but to permit movement of said blade about an axis that extends transversely of said arm, said terminal block and fluid conduit terminal having complementary arcuate surfaces which are pressed together to maintain a leak-proof connection by the coaction of the attachment means and the locking means.

10. In a windshield cleaning apparatus, the combination comprising a wiper blade having a fluid conduit for supplying fluid to a windshield, attachment means mounted on said blade for connecting said blade in hinged relation to a wiper arm, said attachment means including a fluid conduit terminal having a convex surface, a wiper arm provided with a fluid conduit, a terminal block for said fluid conduit positioned adjacent the free end of said arm, said terminal block having a concave parti-spherical surface the center of which is on the axis of said hinged connection, a spring urged member operatively related to said blade terminal and said arm for positively securing said blade to said arm until released manually, and resilient means mounted on said arm for urging the concave parti-spherical surface of said wiper arm terminal block and the convex surface of said wiper blade conduit terminal into cooperative relationship.

11. In a windshield cleaning apparatus, the combination comprising a wiper blade element having a fluid conduit for supplying fluid to a windshield, said conduit terminating at an intermediate point on said blade element, a wiper arm element provided with a fluid conduit extending to the free end thereof, attachment means carried by one of said wiper elements comprising a bearing member, and a fluid terminal member having a convex surface and mounted in the bearing member with capacity for limited rotational movement relative thereto about a fore and aft axis, the other of said wiper elements being provided with an apparatus for hingedly engaging said bearing member to permit movement of said bearing member and blade relative to said arm about an axis extending transversely of said arm, and including a terminal portion having a concave parti-spherical surface the center of which is substantially at the intersection of the axis of said hinged connection and the axis of said bearing member when the arm and blade elements are hingedly connected together, and resilient means mounted on one of said elements for urging said concave and convex surfaces yieldingly toward one another.

12. In a windshield cleaning apparatus, the combination comprising a wiper blade having a fluid conduit for supplying fluid to a windshield, a wiper arm attachment means mounted on said blade for connecting said blade to said arm, said attachment means including a fluid conduit terminal having a resilient convex member and a support for said member supporting the member so as to permit limited rotational movement thereof with said wiper blade and relative to the support about a fore and aft axis, snap locking means mounted adjacent the free end of said arm for hingedly engaging said support and positively securing said blade to said arm with provision for movement of said blade relative to said arm about an axis that extends transversely of said arm, a terminal block for said fluid conduit positioned adjacent the free end of said arm, said terminal block having a concave parti-spherical surface the center of which is substantially at the intersection of the axis of said hinged connection and the axis of said rotational movement when the arm and blade are hingedly connected together, and resilient means mounted on said arm for yieldingly urging said wiper arm terminal block and the convex surface of said wiper blade fluid conduit terminal toward one another.

13. In a windshield wiper apparatus, the combination comprising, a wiper arm element, a wiper blade element, and means for interconnecting said elements, one of said elements being provided with an attachment member adapted to be hingedly engaged by an apparatus carried by the other of said elements, said apparatus comprising a channel-like portion provided with recesses in the sides thereof for receiving a portion of said attachment member, a locking member pivotally mounted within said channel, said locking member being provided adjacent one end with a pair of bifurcated members positioned adjacent the recesses in the sides of said channel, said locking member being spring urged towards locking position, and a pivotally mounted retaining member positioned adjacent the other end of said locking member, said retaining member having a portion adapted to engage portions of said locking member adjacent one end thereof, means biasing said retaining member toward said locking member whereby in the unlocking position of said locking member said retaining member engages said locking member to assist in retaining said locking member in unlocking position and whereby when said locking member is moved to locking position said retaining member snaps over the end of said locking member to detain said locking member positively in locking position.

14. In a windshield wiper assembly, the combination comprising a wiper arm element, a wiper blade element, and means for locking said elements together in hinged cooperative relationship, said means comprising an apparatus attached to one of said elements and a cooperating attachment member attached to the other of said elements and adapted to be engaged by said apparatus, said apparatus comprising a channel member having in each side thereof a recessed entranceway for receiving said attachment member, a spring actuated locking member mounted upon said channel member, said locking member being provided at one end thereof with spaced apart upper and lower jaws, each upper and lower jaw being positioned adjacent a recessed entranceway in said channel member, said upper jaws being of greater length than said lower jaws whereby when said locking member is in unlocking position said lower jaws will be removed from said entranceways and said upper jaws will be moved rearwardly and across the forward inner portion of said recessed entranceways, means for moving said locking member to unlocking position, a snap-over retaining means for retaining said locking member in receiving and locking positions, said upper jaws being responsive to the insertion of said attachment member within said entranceways for tripping said retaining means into position for retaining said locking member in locking position.

15. In a windshield wiper cleaning blade for supplying fluid to a windshield, the combination comprising a windshield wiper blade having a frame provided with longitudinally extending fluid conduits, and connecting means mounted at an intermediate point on said frame for connecting said blade to a wiper arm and for connecting said fluid conduits to a fluid conduit carried by a wiper arm, said connecting means including a fluid conduct member and an attachment sleeve rotatable on said member about a fore and aft axis and including means for hingedly attaching said blade to a wiper arm for rocking movement about a transverse axis, and means on said blade frame adjacent said sleeve for limiting the amount of rotational movement thereof.

16. In a windshield wiper apparatus, the combination of a wiper arm element, a wiper blade element, and means for locking said elements together in hinged cooperative relation with capacity for rocking movement about a transverse axis, said means comprising an apparatus attached to one of said elements and a cooperating attachment member attached to the other of said elements and adapted to be engaged by said apparatus, each of said elements being provided with a fluid conduit, said attachment member comprising a sleeve member provided at opposite sides with trunnions for effecting said hinged cooperative relation, a fluid conduit terminal positioned within said sleeve with capacity for rotary movement relative thereto about a fore and aft axis, means rigidly connecting said conduit terminal to the fluid conduit of one of said elements, and means for limiting the relative rotary movement between said sleeve and said conduit terminal.

17. A windshield wiper blade comprising, in combination, a flexible wiping element, a channeled frame member embracing the wiping element and formed with a fluid intake port and a conduit for delivering cleaning fluid to a windshield, and a rigid spacing member fitted within the frame member in alignment with the intake port and extending across the front and alongside the wiping element said spacing member cooperating with the frame to define a flow space adequate to assure the maintenance of free communication between the intake port and the conduit, and serving to hold back the material of said wiping element from the flow space.

18. A windshield wiper blade comprising, in combination, a flexible wiping element, a channeled frame member, said wiping element including a rear windshield-engaging head portion, a relatively thin intermediate web portion, and a relatively thick forward body portion formed with rearwardly facing shoulders, said body portion having a forwardly facing notch formed in it through a portion of its depth in a zone located substantially midway between the ends of the wiping element and being reduced in thickness in the notch zone, said frame member including a central body portion formed with an intake port for cleaning fluid in register with the notch of the wiping element, and side wall portions which embrace the body portion of the wiping element and thence are extended rearwardly beyond the body portion of the wiping element and are curled inward to define fluid delivering ducts and to engage along their terminal edges with the rearwardly facing shoulders of the wiping element head portion, said side walls being bellied outward in the notch zone to provide fluid conducting passageways alongside the body portion of the wiping element, and a clip set in the notch for maintaining open communication between the intake port and the fluid delivering ducts, said clip including a central body portion, rearwardly extending side walls for embracing and confining the head portion of the wiping element which is of reduced thickness, and forwardly extending end ears for positioning the clip relative to the body portion of the frame and for preventing encroachment of the head material of the wiping element upon the notch space.

19. A windshield wiper blade assembly comprising, in combination, a flexible wiping blade element, an elongated rigid frame therefor, a connector mechanism extending rearwardly from said frame and movable in a plane about a pivot disposed substantially transverse thereto, and including a male cross-connector constructed and arranged to be received and trapped in a complementary female connector mechanism of a wiper arm assembly.

20. A windshield wiper arm adapted for connection to a male hinge member carried by a wiper blade, said wiper arm formed with an opening for receiving the hinge member, and a spring latch mounted on the arm with capacity for movement between a normal retaining position in which the latch extends at least part way across the entrance to the opening and is adapted to oppose withdrawal of the hinge member therefrom and to a non-retaining position in which the latch stands substantially clear of the opening.

21. A windshield wiper arm adapted for connection to the wiper blade member, comprising, in combination, a channeled arm member having a notch therein, and a spring latch mounted in the channel of said arm member with capacity for movement between a normal retaining position in which the latch extends at least part way across the notch entrance in position to oppose withdrawal of an inserted blade member therefrom and to a non-retaining position in which the latch stands substantially clear of the notch.

22. A wiper mounting for interconnecting a wiper arm unit and a wiper blade unit in hinged relationship, one of the aforesaid units including an attachment having bearing portions, and the other of said units comprising a part having spaced bifurcated portions adapted to receive the respective bearing portions, and a member movable transversely of said bearing portions and cooperable with said part for disposition in the open ends of said bifurcated portions to lock the bearing portions therein, and resilient means for retaining said movable member in a locking position.

23. In a windshield cleaning apparatus, the combination comprising a wiper arm element provided with a fluid conduit terminal thereon, a wiper blade element having a fluid conduit terminating at an intermediate point thereon, a male member carried by one of said elements adjacent the fluid terminal thereof, an apparatus carried by the other of said wiper elements adjacent the fluid terminal thereof for engaging said male member, said apparatus comprising a portion having a recess for receiving said male member, and a movable part positioned adjacent said recess and constructed and arranged to have a portion thereof disposed in the entrance of said recess to lock said male member in said recess and to join the terminals of said fluid conduits together.

24. Means for connecting a windshield wiper arm unit and a wiper blade unit, said connecting means comprising a stem adapted to be secured in a substantially erect position with respect to one of said units, a sleeve member normally carried by said stem, and means provided adjacent the opposite sides of said member whereby the same may cooperate with means adapted to be carried by the other unit so as to allow for pivotal movement therebetween.

25. Means for connecting a windshield wiper arm unit to a wiper blade unit, said connecting means comprising a stem adapted to be secured in a substantially erect position with respect to one of said units, a sleeve rotatably mounted on said stem, and means provided on said sleeve whereby means on the other unit may be connected thereto to establish a pivotal connection between said sleeve and said means.

26. Means for connecting a windshield wiper arm unit to a wiper blade unit, said connecting means comprising a stem adapted to be secured in a substantially erect position with respect to one of said units, a sleeve rotatably mounted on said stem, and means on said sleeve adapted for cooperation with means adapted to be carried by the other unit for connecting the units together.

THEODORE J. SMULSKI.

REFERENCES CITED

The following references are of record in the file of this patent:

UNITED STATES PATENTS

| Number | Name | Date |
| --- | --- | --- |
| 2,173,021 | Longwell et al. | Sept. 12, 1939 |
| 2,170,939 | Christen | Aug. 29, 1939 |
| 2,270,589 | Hansen | Jan. 20, 1942 |
| 2,168,202 | Grantham | Aug. 1, 1939 |
| 1,868,783 | Williams | July 26, 1932 |
| 2,264,167 | Paulus | Nov. 25, 1941 |
| 2,240,369 | Horton | Apr. 29, 1941 |
| Re. 8,925 | Potts | Oct. 7, 1879 |

Certificate of Correction

Patent No. 2,432,690.

December 16, 1947.

THEODORE J. SMULSKI

It is hereby certified that errors appear in the printed specification of the above numbered patent requiring correction as follows: Column 8, line 57, the words "Referring to" should begin a new paragraph; column 14, line 34, claim 12, insert a comma after the word "arm"; column 17, line 39, claim 23, for the word "look" read *lock*; and that the said Letters Patent should be read with these corrections therein that the same may conform to the record of the case in the Patent Office.

Signed and sealed this 9th day of March, A. D. 1948.

[SEAL]

THOMAS F. MURPHY,
*Assistant Commissioner of Patents.*